US007509320B2

(12) United States Patent
Hess et al.

(10) Patent No.: US 7,509,320 B2
(45) Date of Patent: Mar. 24, 2009

(54) METHODS AND APPARATUS TO DETERMINE CONTEXT RELEVANT INFORMATION

(75) Inventors: Christopher K. Hess, San Francisco, CA (US); Michael Wynblatt, Moraga, CA (US)

(73) Assignee: Siemens Aktiengesellschaft, Munich (DE)

( * ) Notice: Subject to any disclaimer, the term of this patent is extended or adjusted under 35 U.S.C. 154(b) by 172 days.

(21) Appl. No.: 11/304,917

(22) Filed: Dec. 14, 2005

(65) Prior Publication Data

US 2007/0136267 A1    Jun. 14, 2007

(51) Int. Cl.
  G06F 7/02    (2006.01)
  G06F 7/20    (2006.01)
  G06F 7/04    (2006.01)
(52) U.S. Cl. ................. 707/6; 707/2; 707/3; 707/104.1
(58) Field of Classification Search ...................... 707/5, 707/2, 6, 104.1
  See application file for complete search history.

(56) References Cited

U.S. PATENT DOCUMENTS

| 5,875,446 | A * | 2/1999 | Brown et al. ................... 707/3 |
| 6,438,579 | B1 * | 8/2002 | Hosken ....................... 709/203 |
| 6,618,727 | B1 * | 9/2003 | Wheeler et al. ............... 707/10 |
| 6,751,607 | B2 * | 6/2004 | Kraay et al. ................... 707/3 |
| 6,901,398 | B1 | 5/2005 | Horvitz et al. |
| 6,925,433 | B2 | 8/2005 | Stensmo |
| 6,925,650 | B1 | 8/2005 | Arsenault et al. |
| 7,051,043 | B2 * | 5/2006 | Cameron et al. ........ 707/103 R |
| 7,120,619 | B2 * | 10/2006 | Drucker et al. ................. 706/45 |
| 2005/0149498 | A1 * | 7/2005 | Lawrence et al. ............... 707/3 |
| 2005/0154723 | A1 | 7/2005 | Liang |
| 2005/0256833 | A1 * | 11/2005 | Zeng et al. ...................... 707/1 |
| 2006/0059144 | A1 * | 3/2006 | Canright et al. ................. 707/5 |
| 2006/0106793 | A1 * | 5/2006 | Liang ............................. 707/5 |
| 2006/0107219 | A1 * | 5/2006 | Ahya et al. .................. 715/745 |
| 2006/0218141 | A1 * | 9/2006 | Tuttle et al. ..................... 707/5 |
| 2006/0253439 | A1 * | 11/2006 | Ren et al. ....................... 707/5 |
| 2006/0294095 | A1 * | 12/2006 | Berk et al. ..................... 707/6 |
| 2007/0078849 | A1 * | 4/2007 | Slothouber ..................... 707/5 |
| 2007/0226204 | A1 * | 9/2007 | Feldman ........................ 707/5 |

OTHER PUBLICATIONS

Nat Friedman, "Dashboard", XIMIAN, Jul. 25, 2003. 23pgs.
Daniel Billsus et al., "Improving Proactive Information Systems", IUI '05, Jan. 9-12, 2005, San Diego, California, USA. Copyright 2005 ACM 1-58113-894-6/05/0001. 8pgs.
Jay Budzik et al., "Watson: An Infrastructure for Providing Task-Relevant, Just-In-Time Information". 6pgs.
Mary Czerwinski et al., "Visualizing Implicit Queries For Information Management and Retrieval", Papers, CHI 99 May 15-20, 1999, pp. 560-567.
Michael Beigl, "MemoClip: A Location based Remembrance Appliance", 5pgs.

(Continued)

*Primary Examiner*—John E Breene
*Assistant Examiner*—Patrick E Sweeney

(57) ABSTRACT

Systems and methods are provided to facilitate a user's access to data objects. According to some embodiments, information associated with use of data objects is automatically collected. The collected information may be analyzed to determine relevance evidence between data objects, and the relevance evidence may be stored. A first data object of interest is determined, and, based on the stored relevance evidence, a second data object associated with the first data object is selected. An indication of the second data object may then be provided.

32 Claims, 12 Drawing Sheets

OTHER PUBLICATIONS

Samuel Kaski et al., "User models from implicit feedback for proactive information retrieval", 2pgs.

Susan Dumais et al., "Stuff I've Seen: A System for Personal Information Retrieval and Re-Use", *SIGIR '03*, Jul. 28-Aug. 1, 2003, Toronto, Canada. Copyright 2003 ACM 1-58113-646-3/03/0007. 8pgs.

Meredith Ringel et al., "Milestones in Time: The Value of Landmarks in Retrieving Information from Personal Stores", 8pgs.

Travis Bauer et al., WordSieve: A Method for Real-Time Context Extraction, 14 pgs.

B. J. Rhodes and P. Maes, "Just-in-time information retrieval agents", IBM Systems Journal, vol. 39, Nos. 3&4, 2000, 0018-8670/00, © 2000 IBM, Rhodes and Maes. pp. 685-704.

Jim Youll et al., "Impulse: Location-based Agent Assistance", MIT Media Lab, 2pgs.

Mik Lamming and Mike Flynn, "Forget-me-not" Intimate Computing in Support of Human Memory, Rank Xerox Research Center, Cambridge, England, 9pgs.

Paul De Bra et al., "Task-Based Information Filtering: Providing Information that is Right for the Job". [Retrieved Dec. 12, 2005]. Retrieved from Internet: URL: http://wwwis.win.tue.nl/infwet97/proceedings/task-based.html, 5pgs.

Bradley J. Rhodes, "Margin Notes Building a Contextually Aware Associative Memory", Jan. 9-12, 2000. [Retrieved Dec. 12, 2005]. Retrieved from Internet: URL: http://web.media.mit.edu/~lieber/IUI/Rhodes/Rhodes.html, 9pgs.

"Click popularity—A Promotion Guide". [Retrieved Dec. 12, 2005]. Retrieved from Internet: URL: http://www.apromotionguide.com/click_popularity_theory.html, 3pgs.

"Activity Monitor—Employee Monitoring Software", Network PC Monitoring Software, SoftActivity. [Retrieved Dec. 12, 2005]. Retrieved from Internet: URL: http://www.softactivity.com/employee-monitoring.asp, 5pgs.

"Active Windows Extensions (AWE)". [Retrieved Dec. 12, 2005]. Retrieved from Internet: URL: http://www.autonomy.com/content/Products/Interfaces/AWE.html, 4pgs.

"All Your Information Is Within Reach", Nov. 1, 2005, EasyReach™. [Retrieved Dec. 12, 2005]. Retrieved from Internet: URL: http://www.easyreach.com/enfishusers.asp, 2pgs.

"X1® Desktop Search—Find, view, and act on email and files throughout your enterprise". [Retrieved Dec. 12, 2005]. Retrieved from Internet: URL: http://www.x1.com/, 2pgs.

"Viapoint Corporation—Creator of the Smart Organizer for communications professionals", Nov. 15, 2005. [Retrieved Dec. 12, 2005]. Retrieved from Internet: URL: http://www.viapoint.com/, 1pg.

"blinkx 3.5" [Retrieved Dec. 12, 2005]. Retrieved from Internet: URL: http://www.blinkx.com/overview.php, 4pgs.

Entopia Technology, "True Relevancy" [Retrieved Dec. 13, 2005]. Retrieved from Internet: URL: http://222.entopia.com/technology/relevancy/index.html, 2pgs.

Neil J. Rubenking, "Creo Six Degrees 2.0", Jun. 2, 2004. [Retrieved Dec. 13, 2005]. Retrieved from Internet: URL: http://www.pcmag.com/article2/0,1895,1606220,00.asp. 5pgs.

Henry Lieberman, "Letizia: An Agent That Assists Web Browsing". [Retrieved Dec. 13, 2005]. Retrieved from Internet: URL: http://liever.www.media.mit.edu/people/lieber/Lieberary/Letizia/Letizia-AAAI/Letizia.html. 9pgs.

Bradley J. Rhodes and Thad Starner, "Remembrance Agent: A continuously running automated information retrieval system". [Retrieved Dec. 13, 2005]. Retrieved from Internet: URL: http://www.cc.gatech.edu/fac/Thad.Starner/p/032_40_agents&ubicomp/remembrance-age. 6pgs.

C. Hess, U.S. Appl. No. 11/304,527, filed Dec. 14, 2005, entitled "Methods and Apparatus to Determine a Software Application Data File and Usage".

C. Hess, M. Wynblatt, and M. Sher, U.S. Appl. No. 11/304,432, filed Dec. 14, 2005, entitled "Methods and Apparatus to Recall Context Relevant Information".

C. Hess, U.S. Appl. No. 11/304,415, filed Dec. 14, 2005, entitled "Methods and Apparatus to Abstract Events in Software Applications or Services".

* cited by examiner

| FIRST DATA OBJECT ID 602 | SECOND DATA OBJECT ID 604 | TYPE 606 | WEIGHT 608 | CONF. 610 | COUNT 612 |
|---|---|---|---|---|---|
| DO101 | DO643 | TOGGLE | 2 | 2 | 1 |
| DO101 | DO530 | OPEN AT SAME TIME | 4 | 1 | 1 |
| DO102 | DO331 | TOGGLE | 5 | 4 | 59 |

FIG. 6 and, generally, to methods and apparatus to facilitate a
METHODS AND APPARATUS TO DETERMINE CONTEXT RELEVANT INFORMATION

TECHNICAL FIELD

The present disclosure relates generally to data objects user's access to data objects.

BACKGROUND

Users often need to access a particular piece of information stored on a personal computer. For example, a user might need to find a particular email message or document that is stored on the computer. The increasing amount of information and the many different types of information (e.g., telephone calls, e-mails, and instant messages) that are being accessed by users can make finding a particular piece of information a difficult and time consuming task.

Keyword-based desktop search tools may help find information. However, a user needs to indicate exactly what he or she is looking for by explicitly typing in search terms. In some cases, a user may have information that they have forgotten about, or are not aware of, and as a result are unable to find information quickly and accurately.

Content-based matching and clustering approaches can help find other documents with similar content, but they may not easily find information that has different content even though it is highly relevant.

Neither keyword nor content based approaches may easily find a group of information relevant to a specific context. Consider, for example, a user who creates a document. While working on the document, the user accesses several Web pages and transmits the document to his or her co-worker as an email attachment. When the user later accesses that document, he or she might again be interested in those Web pages and the email message. However, neither keyword nor content based search approaches are typically able to recover all relevant information as a unit in such a situation.

Accordingly, there is a need for methods and apparatus that address these and other problems found in existing technologies.

SUMMARY

Methods, systems, and computer program code are therefore presented for facilitating a user's access to data objects.

According to some embodiments, systems, methods, and computer code are operable to automatically collect information associated with the use of data objects. Moreover, the collected information may be analyzed to determine relevance evidence between data objects. The relevance evidence may be stored, and a first data object of interest may be determined. Based on the stored relevance evidence, a second data object associated with the first data object may be selected, and an indication of the second data object may be provided.

Other embodiments may provide: means for automatically collecting information associated with use of data objects; means for analyzing the collected information to determine relevance evidence between data objects; means for storing the relevance evidence; means for determining a first data object of interest; means for, based on the stored relevance evidence, selecting a second data object associated with the first data object; and means for providing an indication of the second data object.

With these and other advantages and features of embodiments that will become hereinafter apparent, embodiments may be more clearly understood by reference to the following detailed description, the appended claims and the drawings attached herein.

BRIEF DESCRIPTION OF THE DRAWINGS

FIG. 6 illustrates information in an evidence store according to some embodiments;

DETAILED DESCRIPTION

Figure 1:
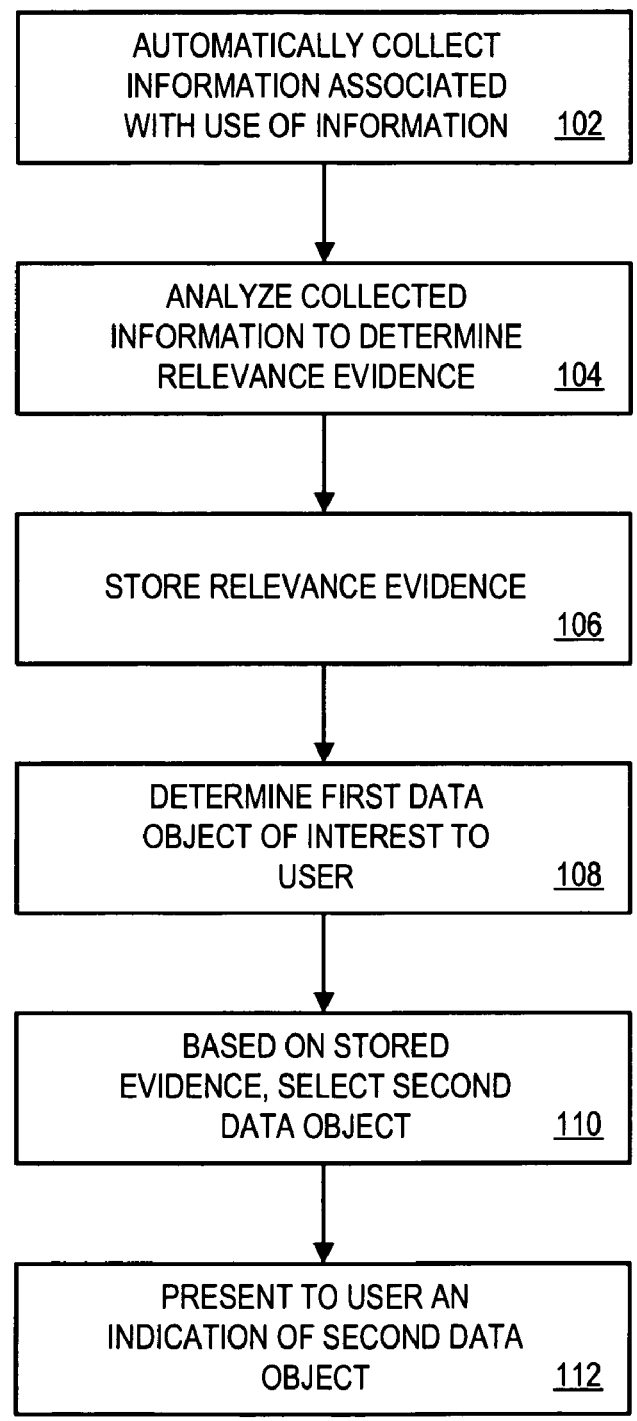
FIG. 1 is a flowchart of a method according to some embodiments.

Some embodiments described herein may automate a process of recalling and discovering information related to a given task or activity. The retrieval of information may be performed proactively by automatically presenting a user with relevant "data objects" as he or she performs operations on a computer system. As used herein, the phrase "data objects" may refer to any piece or type of information. Examples of data objects include (but are not limited to) applications, application files (e.g., MICROSOFT WORD® documents and EXCEL® spreadsheets), other types of files, information folders, email messages, database entries, web pages, telephone calls, instant messages, calendar entries, contact entries, and media objects (e.g., an MP3 file).

Operations may occur when a user acts on data objects through applications, such as by opening, creating, accessing, or activating a data object. An operation may also be initiated from an external peripheral device, such as a printer, private branch exchange (PBX), soft switch, telephony server, communications server, voice modem, Centrex service, or telephone handset. For example, an email server may receive an incoming message and send a notification that a new message has been created.

According to some embodiments, it may be determined which data objects are most relevant for a user's current activity or task (context) by accumulating "evidence" of the relatedness of other data objects and using that evidence to determine what information may be important during a given activity. Evidence may be generated, for example, by continually monitoring information usage, location, and content to determine how pieces of information are connected together. Whenever evidence of a connection is determined, it may be stored into an evidence database. "Usage" evidence might be generated, for example, by looking at how users interact with data objects through applications to infer how the objects might be related. As another example, "location" evidence might be generated by determining the proximity of data objects. As still another example, "content" evidence might be generated by analyzing the terms contained within, data objects to determine how closely that data object matches to other data objects.

This accumulated evidence might then be used to determine which data objects are connected to one another and how strongly the connections are. Evidence may be used to find which data objects are most relevant during an activity and the strength of evidence is used to order the data objects so that more relevant data objects are placed closer to the top of the resulting list. The list of relevant data objects could be, for example, regenerated every time a user gives focus to a different data object.

According to one embodiment of the present invention, the resulting list of relevant data objects is displayed in a Graphical User Interface (GUI) that is visible at a dedicated and/or user-definable area of the computer display (e.g., a column on the left-hand side of the display). Each data object presented in the relevance list could contain, for example, a hyperlink allowing it to be opened with its preferred native application, or alternately, may specify a custom action. Additional hyperlinks might allow other actions to be performed on the data object, such as getting summary information or getting further relevant information. The displayed results could be organized by separating different types of data objects into separate sections of the display.

In addition to the evidence generated results, other relevant information can be displayed based on relevance rules. For example, given an active telephone call, recent email messages from the caller can be displayed based on a rule that first determines the caller from the incoming phone number and then displaying the last few mail messages to/from the person who is identified as the caller.

FIG. 1 is a flow chart of a method of facilitating access to data objects according to some embodiments of the present invention. The flow charts described herein do not imply a fixed order to the steps, and embodiments of the present invention may be practiced in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 102, information associated with use of data objects is automatically collected. For example, a personal computer user might simultaneously open a first document and a second document, and this fact may be automatically collected by a software application executing in the background of the operating system. Note that a data object might be used by a user and/or by another application.

At 104, the collected information is analyzed to determine relevance evidence between data objects. For example, it might be determined that the first document is related to both the second document (because they were open at the same time) and an email message (because the user eventually attached the first document to that email message). This evidence is then stored at 106 (e.g., in a database file).

At 108, a first data object of interest is determined. For example, a user might later re-open the first document and begin to edit the document. Based on the stored relevance evidence, a second data object associated with the first data object may be selected at 110. For example, the second document and the related email message might be selected. At 112, an indication of the second data object is then presented to the user. Note that more than one related data object might be selected and displayed to the user. For example, a list including the second document and the related email message might be displayed in a dedicated area of a GUI.

According to some embodiments, usage, location, and content of data objects may be analyzed to determine relevance evidence between data objects. For example, it might be determined that two documents share a significant number of unusual words. As another example, a first document might refer to a second document. This additional relevance evidence may also be stored, and the selection of the second data object at 110 could further be based on the stored additional relevance evidence. An indication of the selected data object might then be provided at 112 (e.g., by presenting the indication to a user or transmitting an identifier to another application).

Figure 2:
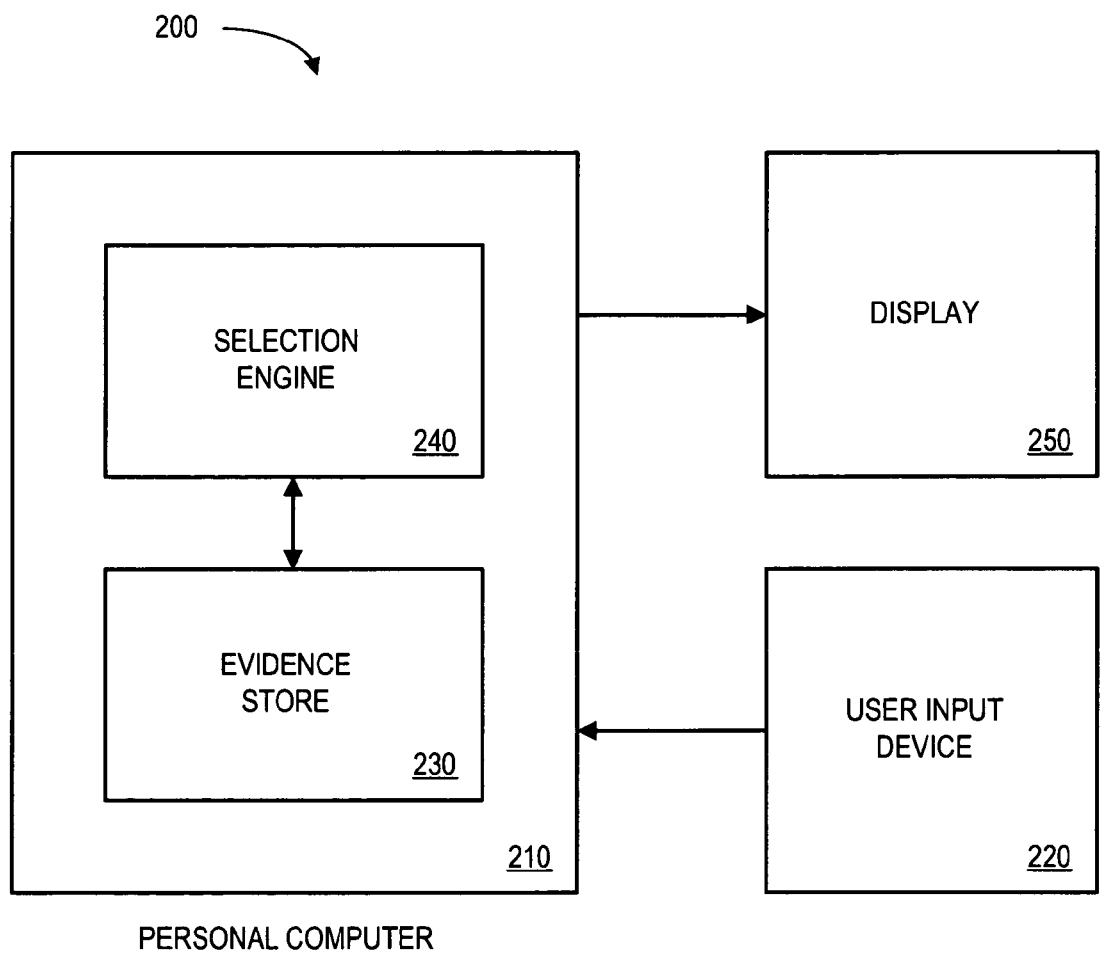
FIG. 2 is a block diagram of a system according to some embodiments.

FIG. 2 is a block diagram overview of a system 200 according to some embodiments of the present invention. The system includes a personal computer 210 (e.g., including one or more INTEL® Pentium® processors) and a user input device 220 (e.g., a computer keyboard or mouse). A user could use the input device 220, for example, to open an email message.

The personal computer 210 includes an evidence store 230 that stores information associated with relatedness between data objects. For example, each entry in the evidence store 230 might indicate that a particular pair of data objects should (or should not) be considered to be related. The evidence store 230 may be associated with any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The personal computer 210 further includes a selection engine 240. When it is determined that a user is interested in a first data object (e.g., he or she opens an email message), the selection engine 240 may access information from the evidence store 230 to select other documents that may be related to the first data object.

Figure 3:
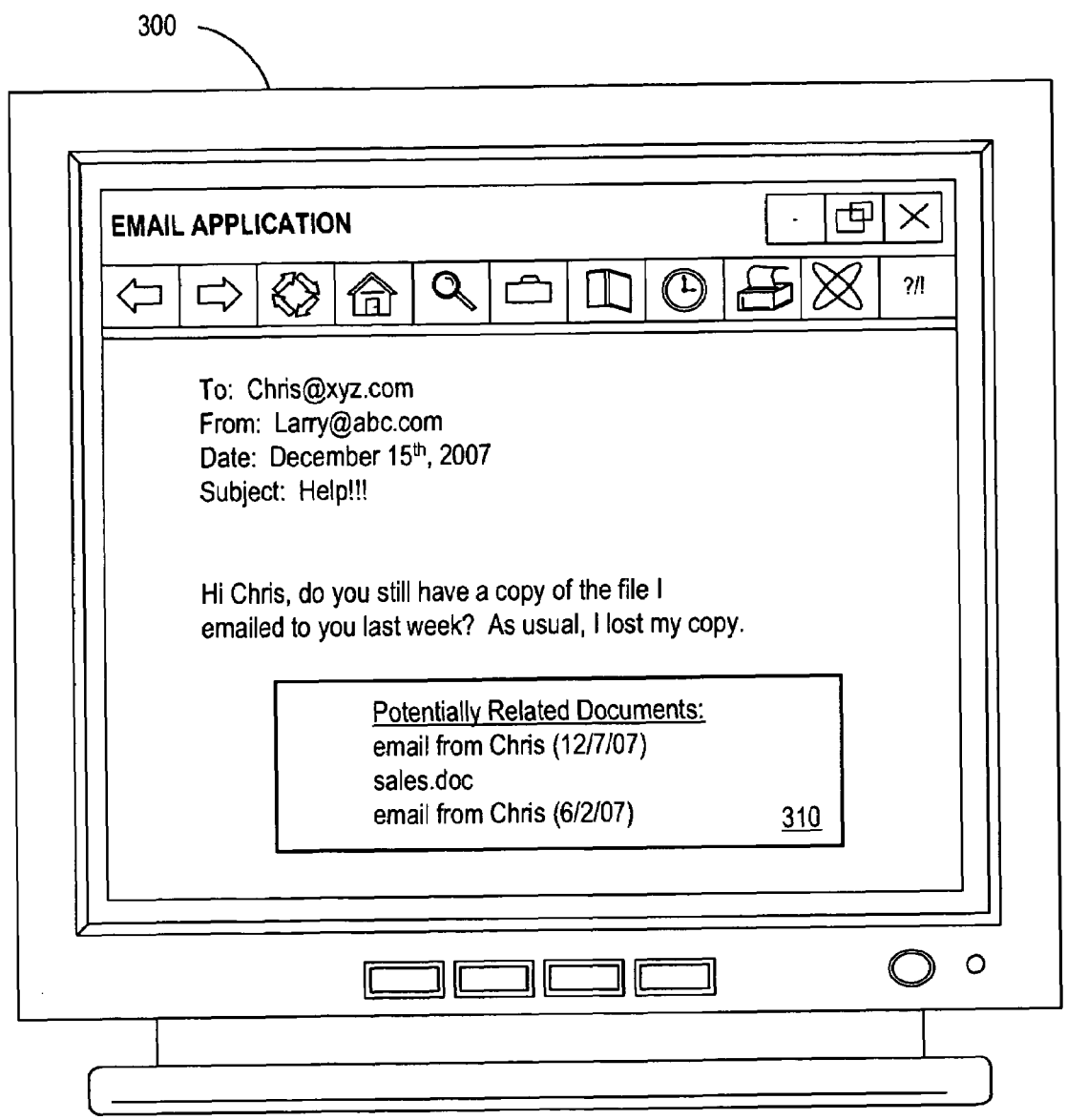
FIG. 3 is a display according to some embodiments.

A display device 250 (e.g., a computer monitor) may then be used to present indications of the related data objects to the user. For example, FIG. 3 is a display 300 according to some embodiments. In this case, the display 300 includes an area 310 in which potentially related documents are listed. In particular, because the user is reading an email message from "Chris@xyz.com," the selection engine 240 has listed three data objects (two email messages and a sales document) that might be related to the particular email message being read by the user. According to some embodiments, a "ranking" number may be displayed next to each indication of a potentially related data object.

Note that in some embodiments described herein, computer applications and peripherals are monitored in order to detect when a significant event on a data object has occurred. Each relevant data object is stored in a database that uniquely identifies the entity in the system. Properties of the data object could include the display name, storage location, globally unique identifier, summary information, and/or timestamps. Monitoring of applications and peripherals might be accomplished through software components that are able to interact with the monitored applications to determine when a data object has been operated on. When such an event is detected, the software component might notify the system that an important "action" has taken place on a specific data object.

An "action" may be, for example, a notification message indicating that a data object on the computing system has been manipulated in a significant way. Types of actions might include, for example: opening a data object, closing a data object, activating a data object, deactivating a data object, copying data to/from a data object, creating a data object, deleting a data object, renaming a data object, or making a copy of a data object.

While a user interacts with various applications (and the underlying data objects), the monitoring components might continually detect and send corresponding actions into the system. An action may also result from receiving a signal from an external peripheral or server, such as receiving an incoming phone call or receiving a new message that may be stored on a server.

Figure 4:
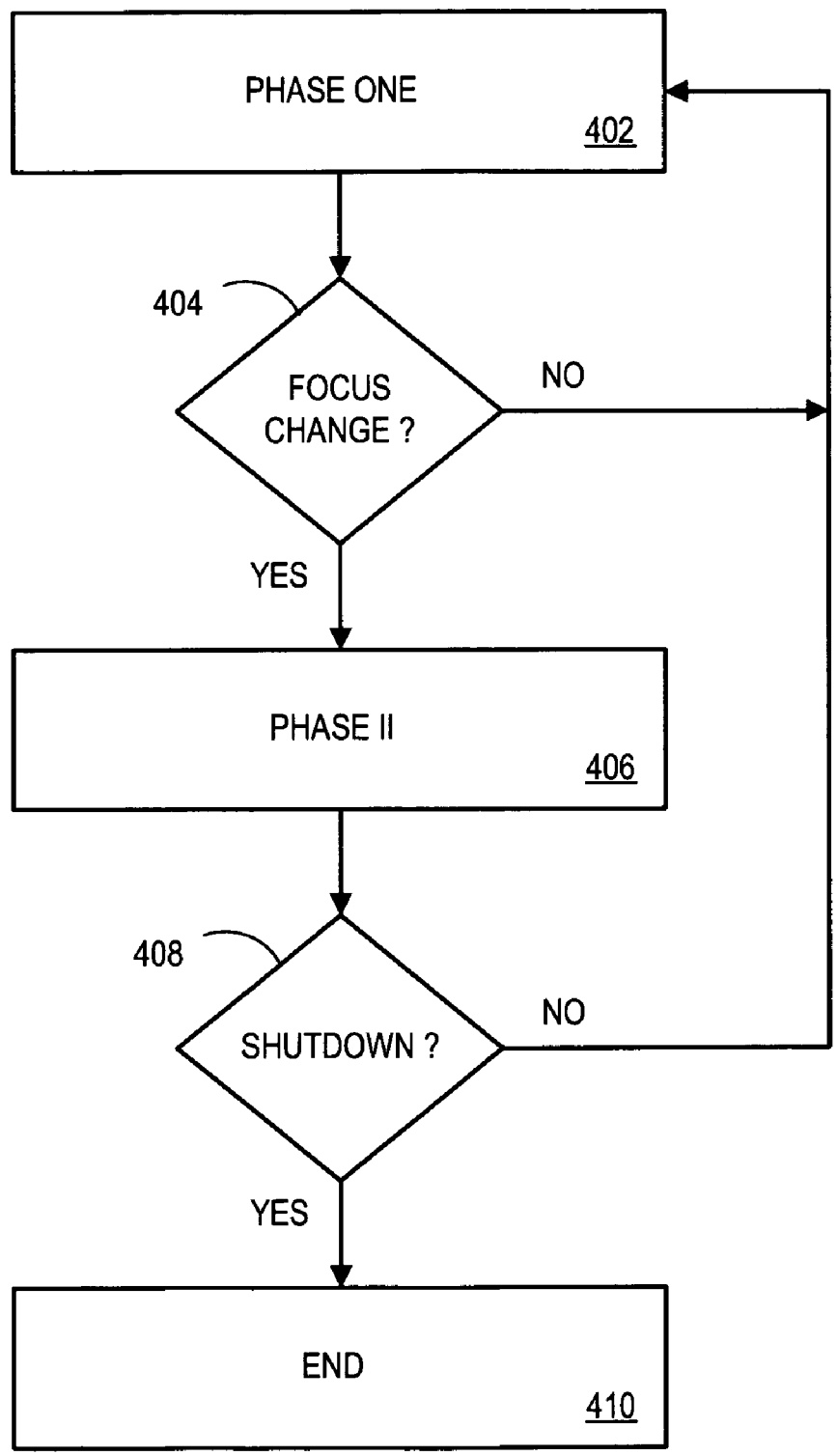
FIG. 4 is a flowchart of an action processing method according to some embodiments.

Actions may be used for two purposes and may be processed in two phases. For example, FIG. 4 is a flowchart of an action processing method according to some embodiments. At 402, "Phase I" processing may be performed. During Phase I, actions may be analyzed to determine if any two data objects are associated in some way and the evidence connecting them is recorded. One embodiment of Phase I processing is provided with respect to FIG. 5.

When no focus change is detected at 404, Phase I processing continues. When a focus change is detected at 404, "Phase II" processing may be performed at 406. During Phase II, an action may act as a signal to initiate a retrieval of relevant information based on accumulated evidence gathered during previous iterations of Phase I. Phase II may be, for example, initiated if an action corresponds to a change of use focus, such as when a new application is activated. One embodiment of Phase II processing is provided with respect to FIG. 7. If Phase II indicates that a shutdown is appropriate at 408, the method ends at 410.

Figure 5:
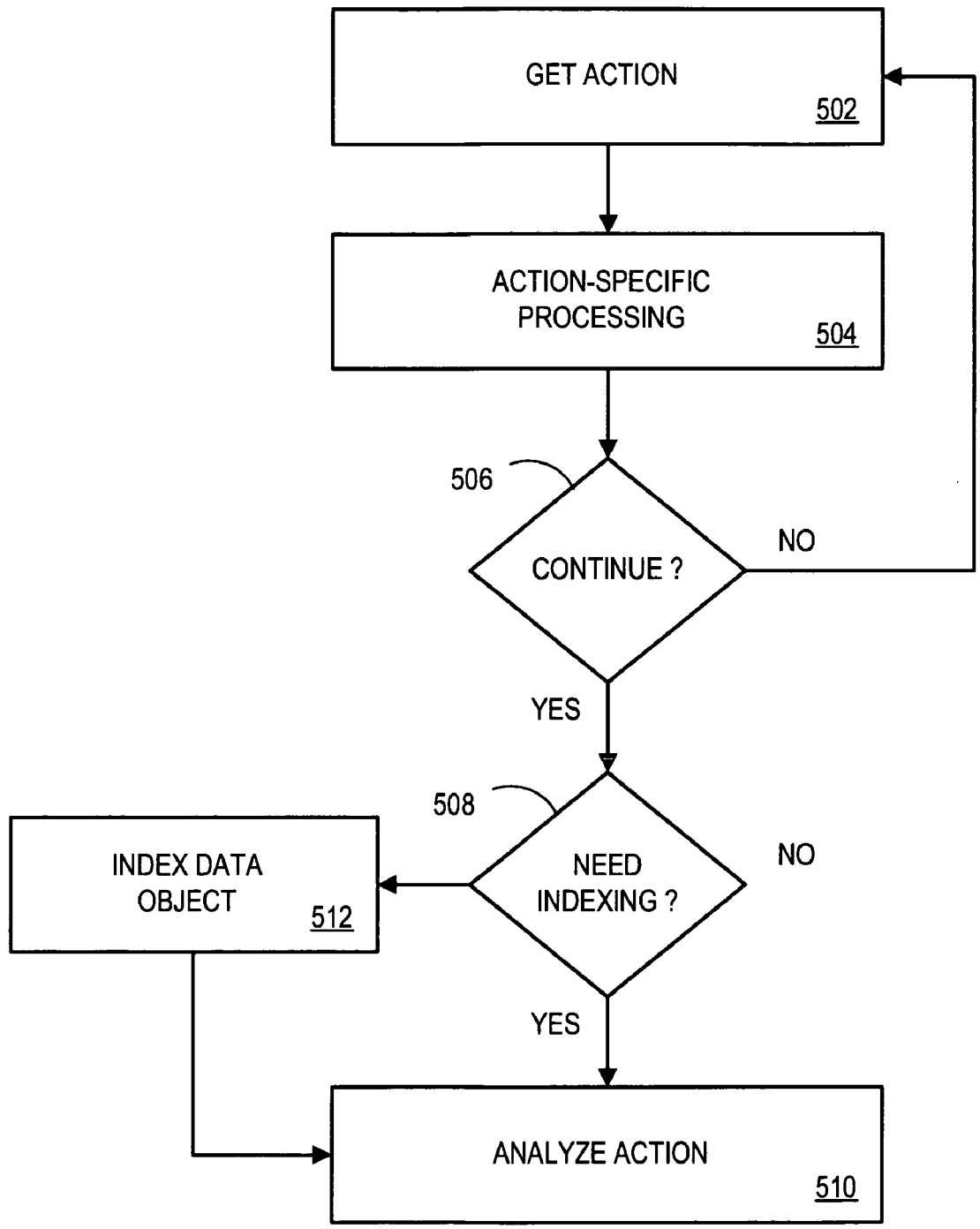
FIG. 5 is a flowchart further illustrating action processing according to some embodiments.

FIG. 5 is a flowchart further illustrating Phase I action processing according to some embodiments. Note that once an action has been generated by a monitoring component, it may be queued up by the system. The system might sequentially retrieve actions from this queue at 502 and processes them in Phase I. The flow chart shown in FIG. 5 describes the steps that are taken, according to one embodiment, to process an action in Phase I.

At 504, action-specific processing may first be applied based on the type of action that was retrieved. For example, an action that specifies that a data object has been deleted from the operating system may remove the data object from any databases. The pre-processor may additionally specify if the action should be processed further. If no further processing is necessary at 506, as might be the case for a deletion action, processing is complete and the system can process the next action at 502.

If further processing is appropriate at 506, the system may decide at 508 if the data object should be indexed. Indexing at 512 might involve, for example, extracting any important terms from the contents of the data object and storing the terms into an index database for the purpose of comparing data objects for term similarity and performing searches to find data objects containing specific terms. A data object might be, for example, indexed if the contents have changed since the last time the system indexed the data object, or if the data object is new and is not yet stored in the index database.

If no indexing was required (or after indexing is performed), the action may be analyzed at 510 to determine if any association between data objects can be inferred based on the action that has occurred. Any inferred relationship may be recorded as "evidence" into a database or "evidence store."

Evidence may be, for example, any information that associates two data objects in some way. FIG. 6 illustrates information in an evidence store 300 according to some embodiments. The illustration and accompanying description of the database presented herein is exemplary, and any number of other database arrangements could be employed besides those suggested by the figure.

Referring to FIG. 6, a table represents the evidence store 600 that may be stored at a personal computer or on a network-accessible device according to an embodiment of the present invention.

Each piece of evidence might consist of two data object identifiers 602, 604 and four properties, which include a type 606, weight 608, confidence 610, and count 612. The "type" property 606 might be a general descriptor of the evidence that identifies how the two data objects are connected. Each type 606 of evidence may have a corresponding "weight" 608 specifying how important different types of evidence are for determining relevance. The "confidence" property 610 might signify how reliable the particular instance of evidence is thought to be. For many types of evidence, a maximum confidence value 610 could be used because the generated evidence can be reliably determined. However, evidence may have a confidence value 610 less than the maximum. For example, in considering associations based on the contents of two documents, the amount of similar words and importance of the words appearing in both documents can affect the degree of similarity, and thus the confidence 610 that the two data objects are related. The count property 612 might specify how many times a type of evidence has been generated between two data objects. The count value 612 might be incremented each time an identical type of evidence is generated between two data objects 602, 604 for which evidence already exists.

Analyzers may be software components that are responsible for discovering a specific type of association between data objects. If such a relationship is found, the analyzer may generate new evidence and record it into the evidence database 600. The system may contain, for example, a core set of analyzers that implement the basic evidence-generation logic. According to some implementations, however, this core set may serve as a foundation for building more complex application-specific analyzers. Some examples of analysis include:

1. Toggle Analysis
   a. Analysis: identifies alternating activation patterns of application windows.
   b. Evidence: associates two data objects where the application windows in which they are hosted have been given focus in sequence.
   c. Rational: toggling back and forth between two applications may signify that the user is referring to multiple data objects during work on a single task.
   d. Category: usage evidence.
2. Simultaneous Use Analysis
   a. Analysis: identifies when two applications are being used at the same time. For example, if a document is opened during a telephone call, it may be related to the person on the call.
   b. Evidence: associates two data objects that are used at the same time.
   c. Rational: using two data objects at the same time may be an indication that the two data objects are being used to complete a single task.
   d. Category: usage evidence.
3. Collocated Files Analysis
   a. Analysis: identifies when data objects are stored in the same location.
   b. Evidence: associates two data objects that are located in the same container (e.g., email messages in a folder).

c. Rational: users often organize information into hierarchical folder structures, with related items residing in the same folder.

d. Category: storage evidence.

4. Content Analysis a. Analysis: identifies data objects that have many of the same words in common. Several different standard information retrieval techniques might be employed to estimate how similar two entities are in content. Some embodiments may use the Term Frequency Inverse Document Frequency (TFIDF) algorithm with cosine similarity measure.

b. Evidence: associates two data objects that have some important terms in common.

c. Rational: data objects with similar content may be related to the same task.

d. Category: content evidence.

5. File Version Analysis a. Analysis: identifies if two data objects are versions of one another. This might be inferred from the naming convention, the similarity of contents, and/or their location.

b. Evidence: associates two versions of the same data object.

c. Rational: versions often have similar content, reside in the same location, and/or have permuted names.

d. Category: usage evidence.

6. Email Thread Analysis a. Analysis: identifies if an email message is part of a threaded conversation.

b. Evidence: associates two data objects where the data objects are email message that are part of the same thread.

c. Rational: messages within the same thread are often related to the same topic.

d. Category: content evidence.

7. Dwell Time Analysis a. Analysis: determines how long a data object was active while it was opened by the user.

b. Evidence: associates a data object to itself and gives higher importance for longer activation time.

c. Rational: data objects that are active for a longer time may have more importance.

d. Category: usage evidence.

8. Copy Content Analysis a. Analysis: identifies the source and destination of copying content (text, images, tables, cells, etc.) between data objects.

b. Evidence: associates two data objects where content is copied from one data object to another data object.

c. Rational: including content from one document into another may indicate the information sources are related.

d. Category: usage evidence.

9. Copy Data Object Analysis a. Analysis: identifies when a data object is copied to create a new data object instance. For example, documents are often created by using an existing document as a template.

b. Evidence: associates two data objects where one data object is copied to create a new data object.

c. Rational: the original source of a data object may be relevant to the new instance of the object.

d. Category: usage evidence.

10. Email Attachment Analysis a. Analysis: identifies attached documents to an email message.

b. Evidence: associates two data objects where one data object is an email message and the other data object is a document attached to the message.

c. Rational: documents attached to a mail message may be related to the message.

d. Category: storage evidence.

11. Saved Attachment Analysis a. Analysis: identifies when an email attachment is saved to disk or other store.

b. Evidence: associates two data object where one data object is an email message and the other data object is a document attached to the message that is stored on disk or in a store.

c. Rational: the on-disk copy and the mail message to which it was originally attached may be relevant to one another.

d. Category: usage evidence.

12. Attached Document Analysis a. Analysis: identifies when a document is attached to an outgoing email message.

b. Evidence: associates two data objects where one data object is an email message and the other data object is a document that originally resides on disk or in a store and is attached to the message.

c. Rational: same as above.

d. Category: usage evidence.

13. Navigation Analysis a. Analysis: identifies when a user selects a hyperlink in a Web page or rich text document.

b. Evidence: associates two data objects where one data object contains a hyperlink and the other data object is pointed to by the hyperlink.

c. Rational: the original creator of the content explicitly placed a hyperlink to allow the user to navigate to new content because there is some connection between the two data objects.

d. Category: usage evidence.

14. Printing Analysis a. Analysis: identifies when a document is printed.

b. Evidence: associates a printed data object to itself to give it higher importance.

c. Rational: printing a document may indicate importance since the user had taken the effort to create a hard copy of the document.

d. Category: usage evidence.

Note that some evidence may not need to be stored in the form of evidence, but might be calculated or retrieved as needed through other means. For example, collocated file analysis might determine which data objects reside in the same container and generate evidence connecting each data object with every other data object in the same location. This evidenced could be determined by storing a container identifier (e.g., associated with a folder in which the data object resides) with each data object and using that identifier to find all data objects that reside in the same container. With this technique, the system might store less evidence and save space in the evidence database.

Referring again to FIG. 4, if an action signifies a change of user focus at 404 (e.g., when a user activates a window containing a document in a word processor application), Phase II processing may be performed. In general, the system may build a list of relevant and related data objects and notify any components of the updated information. The system may use the collected evidence to build an ordered list of other data objects relevant to the target data object. The task of building this list may determine i) which data objects are relevant and ii) how to order the data objects in the list so that the most relevant objects are closer to the top of the list.

Figure 7:
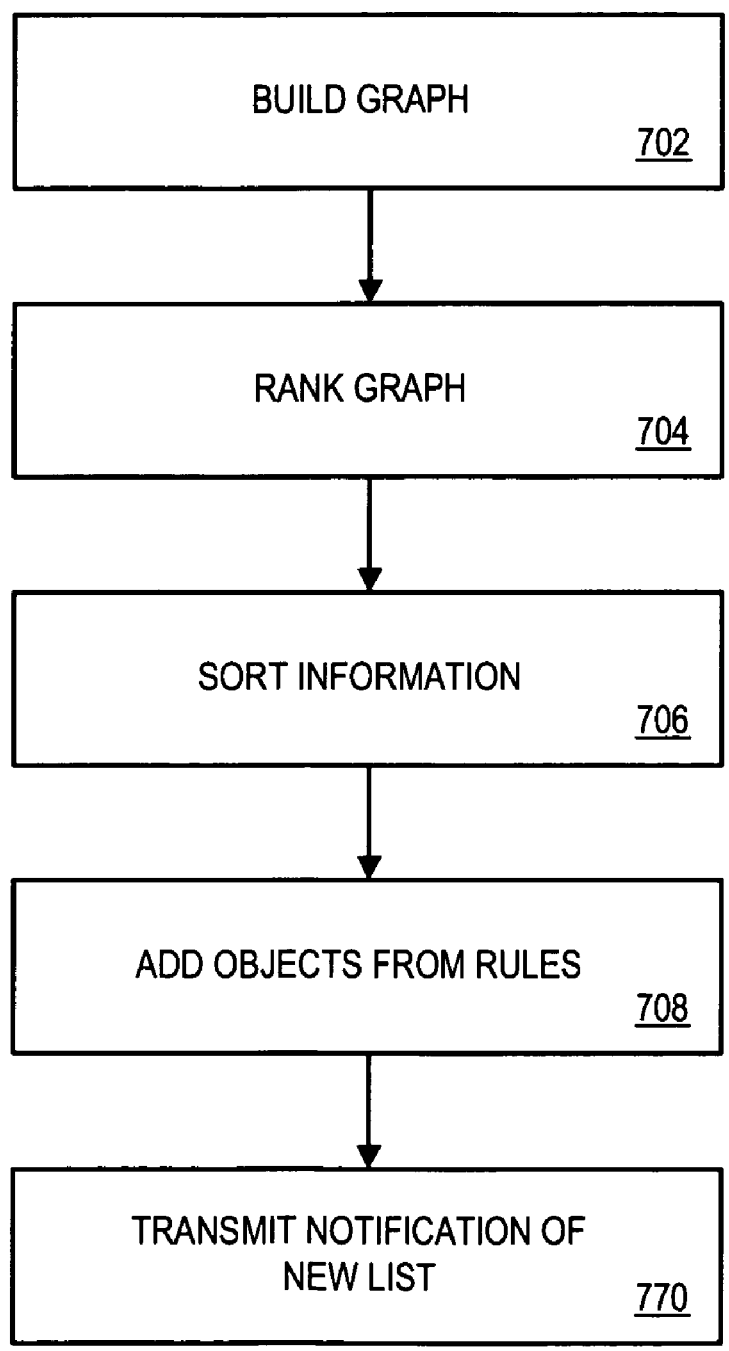
FIG. 7 is a flow chart illustrating action processing according to some embodiments.

For example, FIG. 7 is a flow chart illustrating one embodiment of Phase II action processing. At 702, a "graph" of appropriate data objects may be built. That is, building the list of data objects relevant to the target might involve creating a graph where nodes consist of potentially relevant data objects and edges are the collected evidence that associate data objects.

Figure 8:
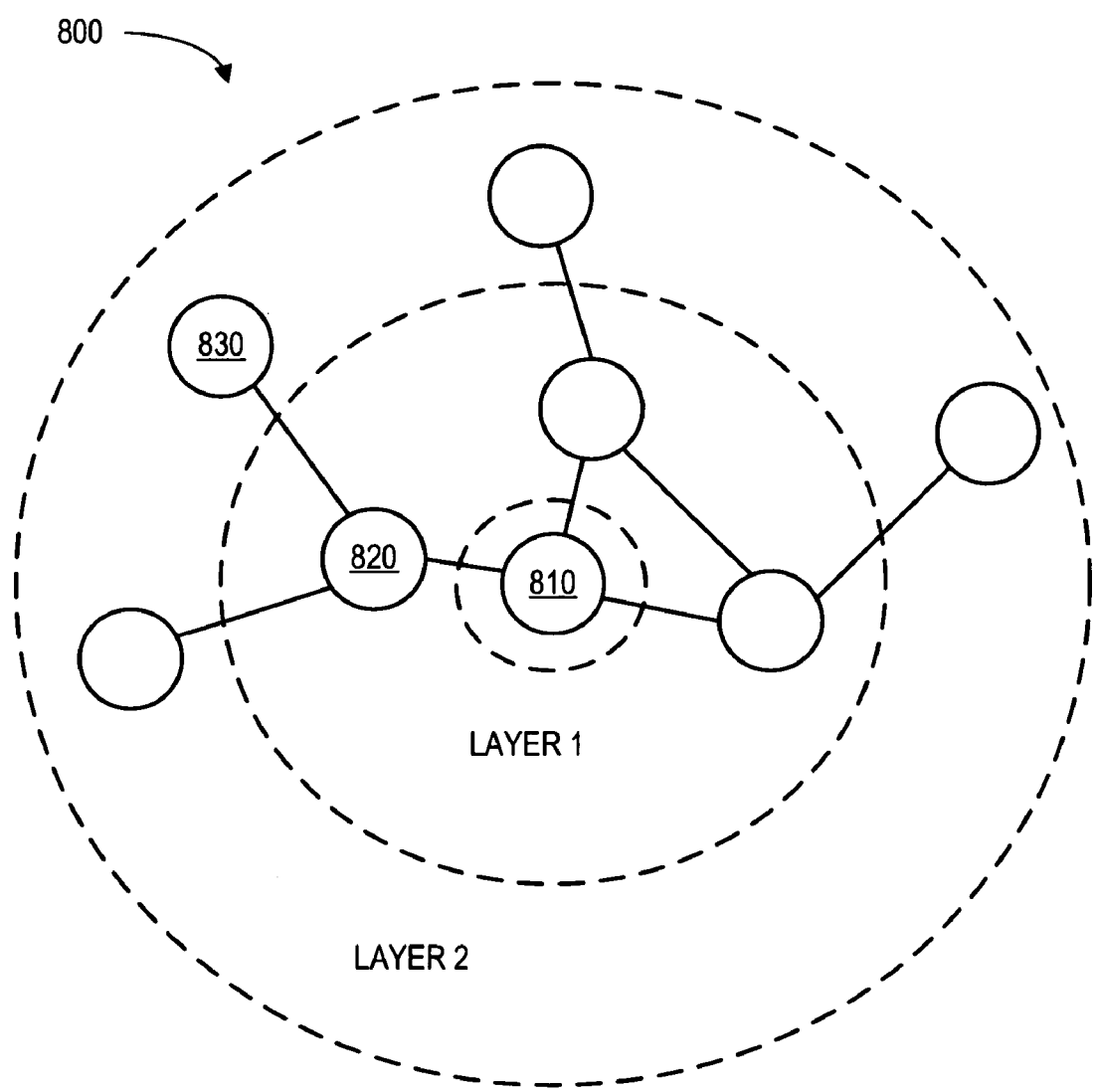
FIG. 8 is layered graph construction according to some embodiments.

FIG. 8 is layered graph construction 800 according to some embodiments. Note that other implementation techniques could be used, such as by using a matrix instead of a graph. Graph construction may proceed in layers, with the graph initially consisting of a single node, the target data object. For each layer, evidence may be found in the database that connects nodes that are already contained in the graph to nodes that are not in the graph yet. When such evidence is found, the new data object may be added to the graph, with an edge connecting the two data objects that correspond to the evidence. The process is continued for some finite number of layers.

Including more than a single layer in the graph results in finding potentially relevant data that may not be directly relevant to the target, but that may be indirectly connected. The graph 800 illustrates two layers of connectedness from a data object of interest 810. That is, data object 820 is directly linked to the data object of interest 810 (and is thus in layer 1) while data object 830 is only linked to the data object of interest 810 through data object 820 (and is thus in layer 2).

Edges in the graph 800 may then be weighted. In one embodiment, this weight is a combination of the different evidence connecting two specific data objects, that is, the sum of the number of collected evidence of each type times its weight factor (note that although a single line is illustrated as connecting any two data objects in FIG. 8, that line might represent multiple entries in an evidence store 6). The weight factor may be the product of the evidence weight, confidence, and count associated with that evidence:

$$weight_{edge} = \sum_{e \in evidence} weight_e * confidence_e * count_e$$

Note that different graph building techniques may be used based on the type of the target data object to help the results better match what information a person may require when accessing a particular type of data object. Building the graph 800 may differ, for example, in the number of layers, type of evidence included in each layer, order in which the types of evidence are added to the graph 800, addition of data objects based on predefined rules, conditions for adding specific evidence, and stopping conditions.

Referring again to FIG. 7, determining the degree of relevance of each data object to the data object of interest 810 or "target" may be calculated at 704 by running an algorithm over the graph 800 that takes into account the type and amount of evidence connecting all the nodes. The algorithm may result in each node being assigned a rank, from which the data objects can be sorted at 706 and thereby ordered by degree of relevance to the target data object. Note that in some embodiments, weights can also be negative, reducing the association between documents.

According to some embodiments, evidence is bi-directional; that is, edges between nodes might initially do not point in any specific direction. The first step in ranking the nodes may be to make the graph 800 directed by forcing all edges to point towards nodes in an equal or lower layer (i.e., layer 2 nodes should point to layer 2 or layer 1 nodes). Next, each node in the graph might be scored using the following formula:

$$score_{node} = \sum_{e \in edges} weight_e$$

Figure 9:
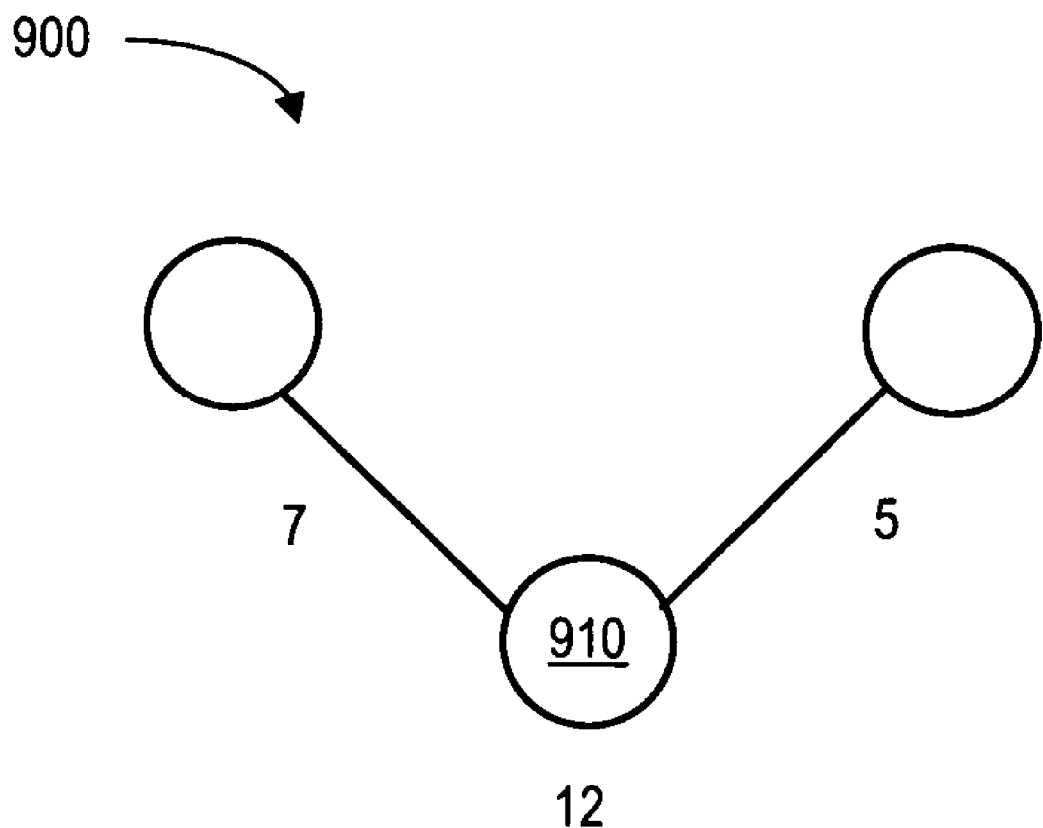
FIG. 9 illustrates relationships between data objects according to some embodiments.

FIG. 9 illustrates relationships 900 between data objects according to some embodiments. In particular, a node 910 may be scored with two connected nodes with link weights of 7 and 5, resulting in a score of 12.

Next, the rank for each entity node may be calculated:

$$rank_{node} = \sum_{e \in edges} (damping_{e,node} * rank_{e,node}) / (weight_e * score_{e,node})$$

According to some embodiments, this equation is solved by iterating until the ranks for each node do not change beyond some threshold. The damping factor may be, for example, used to weigh nodes farther away from the target data object with less value. The algorithm uses the edge weights of connected nodes to determine the rank value from which an ordering may be assigned.

According to some embodiments, a subset of data objects may be grouped together if there is a specific relationship between them. For example, if there is high confidence of "file version evidence," implying that the two data objects are likely different versions of the same file, one of those data objects may be chosen to represent the group. According to some embodiments, the choice to have such objects grouped is a user-configurable setting.

This method describes a way to determine data objects relevant to a given target data object through the use of collected evidence. Referring again to FIG. 7, a further method of determining relevant data objects may be through a defined set of rules at 708. These data objects might not be included in the relevance graph and may be derived from any source. As such, they might not be ranked (and therefore may be ordered in any way) and would not affect the results of relevant data objects determined from graph construction.

Such rules may be based on the type of the target data object and could be evaluated when the target data object changes (e.g., the user changes focus). Rules may take the target data object and determine any other data objects that are related based on a defined expression, such as querying a database for specific information. For example, an incoming phone call may trigger a rule to display recent email messages from the caller.

Application of a rule might require a person, company, or other entity to be first associated to one or more data objects. A person, company, or other entity may be represented by a contact entry data object, such as a record in any contact management application (e.g., email application, phone application, or customer relationship management application), customer record, or entity identifier. Based on the entity, other relevant data objects may be determined, either in real-time or by retrieving them from a database, server, or application. Some examples of rules may be:

1. Recent email—find information about email messages that has been received from a particular person. This list might be limited by time or length.

2. Email thread—find information about email messages that are part of an email conversation with one or more people. This list might be limited by time or length.

3. Recent phone call history—find information about times of recent telephone conversations to/from a person. This list might be limited by time or length.

4. Recent instant messages—find information about recent instant message archives from a particular person. This list might be limited by time or length.

5. Recent attachments—find information about attachments that have been received from a particular person. This list might be limited by time or length.

6. Contact information—find information about a particular person, company, or other entity, such as email address, phone number, home address, business address.

7. Appointment information—find information about appointments in the near future regarding a particular person.

If an action specifies a change of user focus, such as activating a new application window, the system may notify any registered components that a new data object has become the target and that the list of relevant data objects has been recalculated. In some embodiments, a component automatically displays the list of data objects relevant to the target data object in a GUI. The interface may include a window that resides on the side of the user's desktop computer screen. Each data object may be presented with a hyperlink that allows the object to be accessed, a display name to visually identify the object, a storage location that uniquely identifies the object, and/or a ranking value indicating its degree of relevance to the target data object. Through the graphical interface, actions might be performed on the data objects, such as opening one or more data objects, performing a search on a data object (e.g., treat it as a target data object), or removing a data object from the system databases.

In another embodiment, any registered component receives the list of relevant data objects through a programmatic interface, for example as a list of data objects containing the characteristics of the relevant objects.

Note that usage analysis may involve identifying patterns in the stream of recent past actions. Since the proper operation of the analyzer components may depend on the action stream being well formed, the system might ensure that the sequence of actions is in correct order. In some cases, application monitoring components might send incorrect actions into the system, either due to improper implementations or incorrect action order provided by the native applications being monitored. As a result, the system may need to insert or remove actions into the stream to guarantee appropriate form.

A well formed action stream from an application monitor might take the form, for example: open, activate, <deactivate|activate>, deactivate, close, which corresponds to the underlying data object being opened, activated/deactivated as the user gives focus to other applications, and closed, respectively. According to some embodiments, the system employs the following set of rules to help ensure that the stream is well formed:

1. An activate action should follow an open action.

2. An open action should be preceded by a deactivate action.

3. An activate action following an open action should encompass the same data object.

4. An activate action should be ignored if the data object is active.

5. A deactivate action should be ignored if the data object is not active.

6. An activate action should be ignored if the data object is not open.

7. A deactivate action should be ignored if the data object is not open.

8. A close action should be ignored if the data object is not open.

According to some embodiments, the system maintains several historical lists of past actions so that analyzer components may inspect the actions and detect patterns.

According to some embodiments, when a hyperlink corresponding to a data object is selected, the default action is to instruct the system to open the data object within its native application. However, if a data object resides in a database or requires a special application to access it, selecting the hyperlink can instruct the system to communicate with a registered application to perform a custom action. This method may cover, for example, accessing email messages in a messaging application, personal contact information in an personal organizer application, appointments in a calendar application, records in a customer management application, placing phone calls, retrieving caller history records, and/or any other process that might be used to manipulate data objects. For example, if the telephone number of a person is presented as a relevant data object, selecting the number in the display may contact a Voice Over IP (VOIP) software phone running on the computer system and place a telephone call to that person's telephone number.

Figure 10:
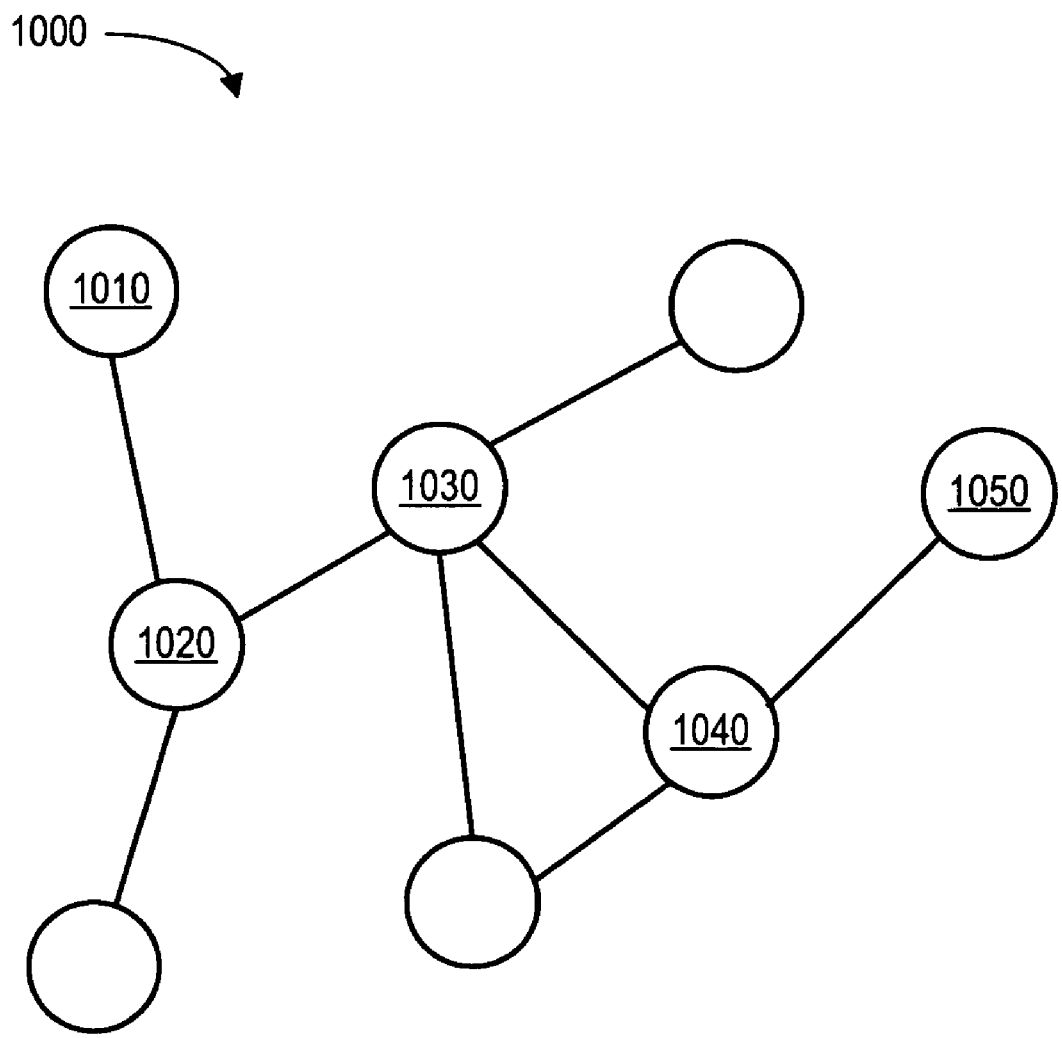
FIG. 10 illustrates indirect relationships between data objects according to some embodiments.

Relevance of information to a target data object may be determined from collected evidence. If a layered graph is used to determine relevance, data objects may be related through "indirect" connections (there need not be evidence directly connecting two data objects to signify that they are relevant to one another). For example, FIG. 10 illustrates indirect relationships between data objects according to some embodiments. In particular, data object 1010 is related to data object 1050 only through three intermediate data objects 1020, 1030, 1040.

These indirect relationships may be in contrast to other approaches that only use content to determine relevance through common terms. In such approaches, documents may be directly related via identical (or similar) words that appear in a collection of documents. However, allowing data objects to be connected through several levels of indirection might bring in information relevant to a context that an approach using only direct associations would miss.

For example, consider an email message that is received with an attachment created by the sender of the message. The attachment is saved to disk as a document, and then worked on. Some content from the Internet (e.g., an image from a Web page) is copied to the document, and the user sends the document back to the originator as a new email message attachment. If later the document creator calls and asks about the source of the excerpt, the system can determine that the Web page is relevant to the phone call, even though there is no content directly connecting the phone call and the Web page.

According to some embodiments, a data object that is displayed in the list of relevant objects may be used to initiate a further search for relevant information. This can be done to find a data object that is not yet in the list, but the user feels is relevant to one of the data objects that is in the current list.

Figure 11:
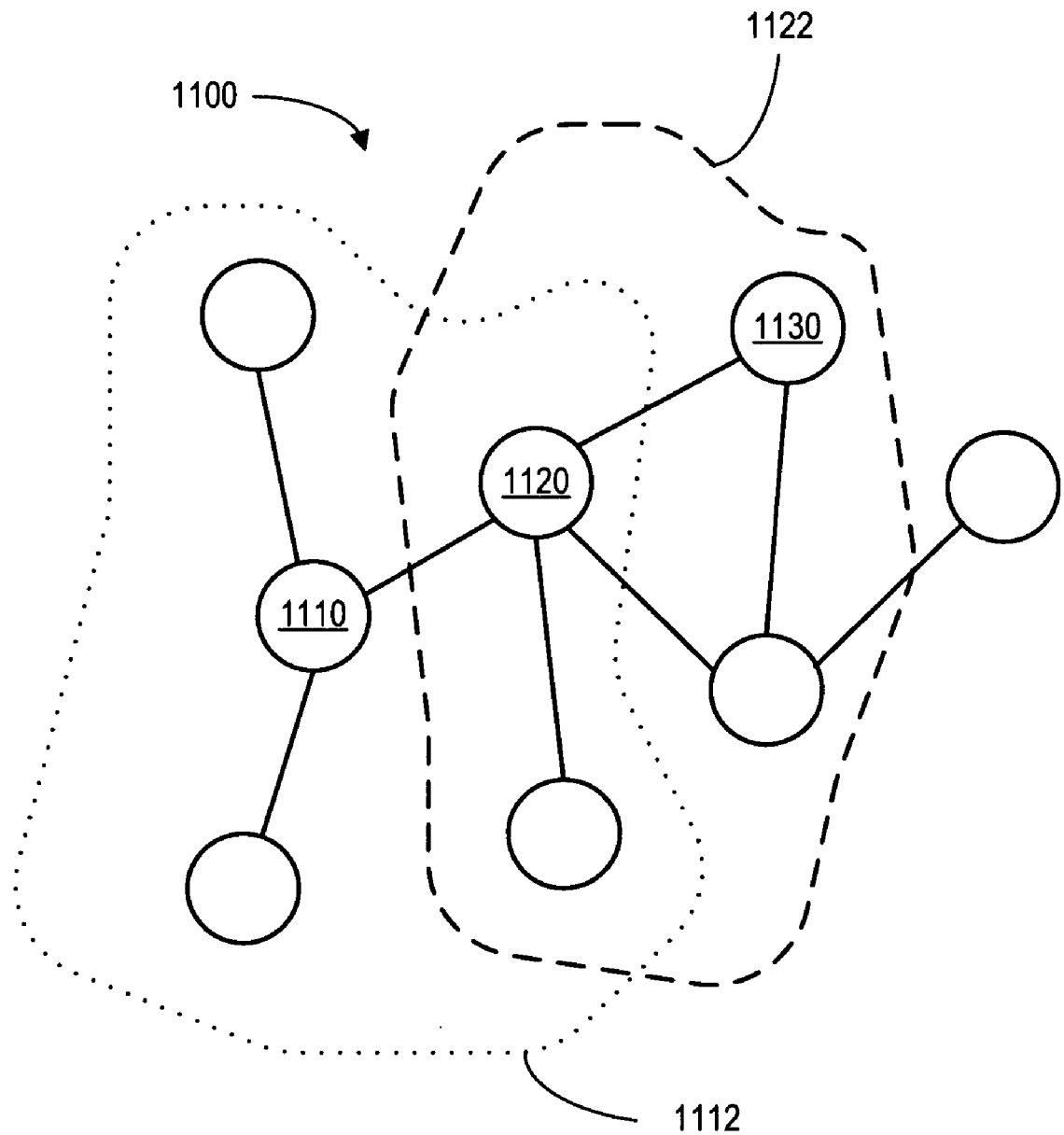
FIG. 11 illustrates an evidence-based search according to some embodiments

FIG. 11 illustrates an evidence-based search 1100 according to such embodiments. A first data object 1110 is opened by a user, and a first set of potentially related data objects 1112 is selected by the system and displayed to the user. The user does not find the data object 1130 that he or she actually needs, but does notice a second data object 1120 that seems more related to 1130 than the first data object 1110. The user can instruct the system to make that second data object 1120 the new target data object. As a result, a new set of potentially related data objects 1122 is selected by the system and displayed to the user. The user will now see the data object 1130 that is actually of interest.

For example, a user may be working on a document, for which the systems calculates other relevant documents. If the person is looking for a particular document that does not appear in the list, but feels is relevant to one of the items in the list, the user can select a special hyperlink of the item, causing it to become the target data object, resulting in a new list of relevant documents to be calculated and displayed. As a further example, suppose a user is looking for a particular email message. Perhaps a keyword search results in finding a document that was attached to the desired email. The user could then perform a search based off the located document by selecting the provided special hyperlink, causing the email to be displayed because evidence connects the email with the attachment. With this method, users may follow evidence paths to locate information based on context rather than content without entering keyword search terms.

Evidence may serve as the basis for determining data object associations. According to some embodiments, several methods are possible to generate evidence for different purposes.

For example, real-time evidence creation may be provided. In this case, processing of actions may occur as the user interacts with data objects. However, evidence might be generated as part of a background process (when the user is not actively using the system). When the system remains idle for some time, a background process may loop over available data objects and create a pseudo action encapsulating the data object, which can be processed in Phase I as if it were generated by the user accessing the data object for the first time. Similar to real-time action processing, pseudo actions may be content indexed and analyzed for evidence generation.

As another example, manual evidence creation may be provided. Typically, evidence may be generated when the system determines that there is an association between two data objects. However, there may be times when a user wishes to explicitly associate two data objects with each other (to increase the likelihood that a data object will appear in the calculated relevance list, or to increase the rank of a data object). For example, suppose a user is working on a document and wishes to associate some contact information to the document so that it is readily available the next time the document is worked on. This in effect may add a "bookmark" to the document, where the bookmark entity can be any type of data object.

According to some embodiments, a tool is provided which allows the user to create evidence by selecting the two data objects that are to be associated together. For example, the user might click an icon representing one data object and then click a different icon representing another data object. Such an action may manually create or increase an association between the two data objects. The tool might be used to manually delete associations between data objects which appear unhelpful.

According to some embodiments, the system periodically (on a synchronous or asynchronous basis) deletes evidence from the evidence store according to pre-determined and/or user-configured rules. Some examples of rules may include:

Delete evidence that was created before some time in the past.

Delete evidence when one data object is connected to too many other data objects.

Delete evidence when two data objects are determined to be versions of each other.

Delete evidence when the contents of a data object has changed that would invalidate previously generated evidence.

In some cases, data objects may be stored in a database and include a storage location and unique identifier. Since data objects may be created, deleted, copied, and moved, the system might ensure that the location information of the data objects stored in the database are kept synchronized with the real locations (to maintain the integrity of the stored evidence). If the stored location and real location of a data object are not synchronized, selecting a hyperlink may result in an error because the system would not know how to find the data object and take action on it. According to some embodiments, the system keeps track of the locations of data objects as users actively create, delete, rename, copy, and/or move them. As a result, the system is able to synchronize the location information in real-time. Other embodiments scan the existing data objects as a background process and synchronize any objects that have inconsistent location information in the database.

According to some embodiments, the process of synchronization is accomplished as follows. When a data object is processed, it may be looked up in the database using the unique identifier. If the data object is found, the location information is read from the database and compared with the real location information. If they are different, the location the location information in the database may be updated to the current real value.

Thus, embodiments of the present invention may provide efficient and useful ways to facilitate a user's access to data objects.

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although some embodiments have been described herein with respect to a single data object being a target or focus from which a list of potentially relevant data objects may be generated, according to other embodiments more than one focus data object may be permitted (any file that is currently "open" may be considered a focus data object). In this case, separate lists of potentially relevant data objects could be generated and displayed. As another approach, the two lists could be blended according to an algorithm and then displayed to the user.

Moreover, although some embodiments have been described herein with respect to a personal computer, note that other devices may practice any of the disclosed embodiments. Examples of such other devices include handheld devices, game devices, and media devices (e.g., set-top boxes).

Figure 12:
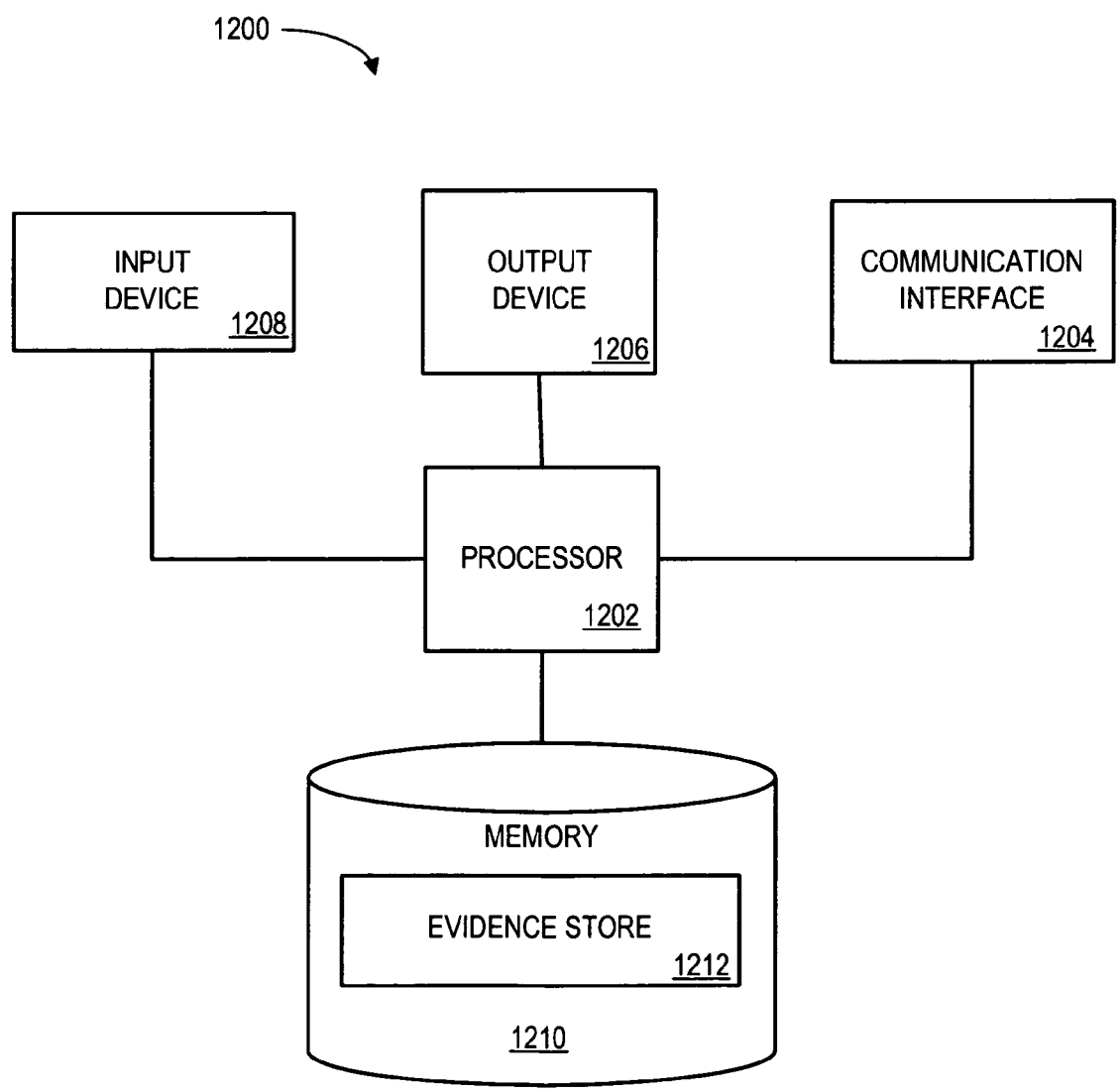
FIG. 12 is a block diagram of a system according to another embodiment.

In addition, although some embodiments have been described with respect to a single personal computer, note that embodiments may be associated with multiple devices. For example, FIG. 12 illustrates an apparatus 1200, such as a personal computer, that includes a processor 1202, an input device 1208 (e.g., a computer mouse), an output device 1206 (e.g., a computer monitor), and a memory 1210 with an evidence store 1212.

According to this embodiment, however, the apparatus 1200 further includes a communication interface 1204 that is able to exchange information through a "network." As used herein, the term "network" may refer to, for example, a Local Area Network (LAN), a Metropolitan Area Network (MAN), a Wide Area Network (WAN), a proprietary network, a wireless network, or an Internet Protocol (IP) network such as the Internet, an intranet or an extranet.

As a result, the apparatus 1200 may determine evidence information associated with multiple devices or may use the evidence generated by multiple people. For example, the apparatus might determine that a particular document could be associated with a photograph stored on another personal computer in a user's home network. As a further example, two users may work independently on separate computers with different documents that each has evidence connected to a mutual shared document. Each user may then receive the other user's document as relevant to their own through the shared document.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of facilitating access to data objects, comprising:
   automatically collecting information associated with use of data objects by a user, the collected information including a toggle count representing a number of times the user has activated an application in connection with a first data object before activating an application in connection with a second data object;
   analyzing the collected information to determine relevance evidence between pairs of data objects;
   storing the relevance evidence in a table indexed by identifiers associated with data object pairs;
   determining that the first data object has become of interest to the user;
   based on the stored relevance evidence, selecting the second data object associated with the first data object in accordance with the toggle count and a pre-determined rule; and
   providing an indication of the second data object to the user.

2. The method of claim 1, further comprising:
   analyzing content of data objects to determine additional relevance evidence between pairs of data objects; and
   storing the additional relevance evidence, wherein the selection of the second data object is further based on the stored additional relevance evidence.

3. The method of claim 2, wherein the additional relevance information is associated with a relative frequency of words within pairs of data objects in accordance with a term frequency-inverse document frequency algorithm.

4. The method of claim 1, wherein at least some of the data objects comprise at least one of: (i) an information file, (ii) an information folder, (iii) an email message, (iv) a database record, (v) an application specific data object, (vi) a web page, (vii) a telephone call, (viii) a calendar entry, (xiv) an instant message, or (xv) a media object.

5. The method of claim 1, wherein said collecting information comprises collecting events associated with an operating system graphical user interface.

6. The method of claim 5, wherein said collecting information further comprises collecting events associated with an operating system file system driver.

7. The method of claim 1, wherein said collecting information comprises collecting information associated with locations of data objects in connection with at least one of an operating system file system driver or an application specific index.

8. The method of claim 1, wherein a plurality of data objects are selected and presented to the user as a list of data object names.

9. The method of claim 8, further comprising:
   receiving from the user a selection of one of the data object names in the list; and
   activating the data object selected by the user.

10. The method of claim 1, wherein said collecting, analyzing, and storing are performed at least one of: (i) on a substantially real-time basis, (ii) as a background task, (iii) on a periodic basis, or (iv) on a continuous basis.

11. The method of claim 1, wherein said collecting further comprises:
    comparing physical storage locations of data objects; and
    determining relevance evidence when a pair of data objects are stored substantially co-located.

12. The method of claim 1, wherein the relevance information table is stored in an evidence store, and further comprising:
    receiving an indication from the user; and
    based on the received indication, adding, deleting, or adjusting information in the evidence store.

13. The method of claim 1, wherein the relevance information table is stored in an evidence store, and further comprising:
    automatically deleting or adjusting evidence in the evidence store based on at least one of: (i) an amount of time the evidence has been in the store, (ii) a change in data object content, or (iii) a degree of connectedness between a pair of data objects.

14. The method of claim 1, wherein the relevance information table is stored in an evidence store, and further comprising:
    updating information in the evidence store when a name or location associated with a data object changes.

15. A computer-readable medium storing instructions adapted to be executed by a processor to perform a method, said method comprising:
    automatically collecting information associated with use of data objects by a user, the collected information including a toggle count representing a number of times the user has activated an application in connection with a second data object before while an application in connection with a first data object is active;
    analyzing the collected information to determine relevance evidence between pairs of data objects;
    storing the relevance evidence in a table indexed by identifiers associated with data object pairs;
    determining that the first data object has become of interest to the user;
    based on the stored relevance evidence and additional relevance evidence, selecting a set data object in accordance with the toggle count and a pre-determined rule, the set including the second data object; and
    presenting to the user a list of the set of selected data objects.

16. An apparatus, comprising:
    an input device to receive indications from a user;
    an evidence store to contain evidence entries indicating associations between pairs of data objects, the evidence entries being indexed in a table by identifiers associated with data object pairs and including: (i) usage evidence, (ii) storage evidence, and (iii) content evidence, wherein the usage evidence includes a value indicating an amount of time at lease one of the data objects in the pair was active while opened by the user;

a selection engine, coupled to the evidence store, to select a set of data objects associated with a data object being accessed by the user; and an output device to display the set of selected data objects to the user.

17. The apparatus of claim 16, wherein an association between a pair of data objects is increased when those data objects are accessed at substantially the same time.

18. The apparatus of claim 16, wherein an association between a pair of data objects is increased when those data objects are accessed in sequence.

19. The apparatus of claim 16, wherein an association between a pair of data objects is increased when those data objects are stored on a computer-readable medium substantially close to each other.

20. The apparatus of claim 16, wherein an association between a pair of data objects is increased when those data objects contain similar content.

21. The apparatus of claim 16, wherein an association between a pair of data objects is increased when one of the data objects is an email message and the other data object is an attachment to the email message.

22. The apparatus of claim 16, wherein an association between a pair of data objects is increased when both data objects are part of the same communications thread.

23. The apparatus of claim 16, wherein an association between a pair of data objects is increased when both data objects are communications and have been sent/received within a certain time proximity.

24. The apparatus of claim 16, wherein an association between a pair of data objects is increased when those data objects have similar names.

25. The apparatus of claim 16, wherein an association between a pair of data objects is increased when information is exchanged between those data objects.

26. The apparatus of claim 16, wherein an association between a pair of data objects is increased when those data objects are versions of one another.

27. The apparatus of claim 16, wherein an association between a pair of data objects is increased when a copy of one data object is made to another data object.

28. The apparatus of claim 16, wherein an association between a pair of data objects is increased when (i) one of the data objects is an email message and the other data object is an attachment to the email message that is saved to a store and (ii) one of the data objects is an email message and the other data object is loaded from a store as an attachment to the email message.

29. The apparatus of claim 16, wherein an association between a pair of data objects is increased when a hyperlink in one data object is clicked where the hyperlink points to the other data object.

30. The apparatus of claim 16, wherein the importance of a data object is increased the longer it remains activated.

31. The apparatus of claim 16, wherein the importance of a data object is increased when it is printed.

32. The apparatus of claim 16, wherein data objects with some specific relationship are automatically grouped together and represented to the user by a single data object, wherein said grouping is controlled by a user-configurable setting.

* * * * *